United States Patent
Ishikawa et al.

(10) Patent No.: US 6,804,507 B2
(45) Date of Patent: Oct. 12, 2004

(54) MOBILE PAGING TELEPHONE WITH AN AUTOMATIC CALL BACK FUNCTION

(75) Inventors: Hironari Ishikawa, Yokohama (JP); Hitoshi Itakura, Yokohama (JP); Hisashi Nakagomi, Yokohama (JP)

(73) Assignees: Matsushita Communication Industrial Co., Ltd., Yokohama (JP); NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 10/222,866

(22) Filed: Oct. 3, 2002

(65) Prior Publication Data

US 2003/0017855 A1 Jan. 23, 2003

Related U.S. Application Data

(63) Continuation of application No. 09/033,566, filed on Mar. 2, 1998, now Pat. No. 6,466,782.

(30) Foreign Application Priority Data

Feb. 28, 1997 (JP) .............................................. 9-046250
Sep. 25, 1997 (JP) .............................................. 9-260031

(51) Int. Cl.[7] .......................................... H04M 11/00
(52) U.S. Cl. .................................................. 455/412.1
(58) Field of Search ................................ 455/412, 417, 455/421, 450, 564, 412.1

(56) References Cited

U.S. PATENT DOCUMENTS

| | | | |
|---|---|---|---|
| 5,128,981 A | 7/1992 | Tsukamoto et al. | |
| 5,416,828 A | 5/1995 | Hiramatsu et al. | |
| 5,459,458 A | 10/1995 | Richardson et al. | |
| 5,572,576 A | 11/1996 | Klausner et al. | |
| 5,636,266 A | 6/1997 | Ranganatyh et al. | |
| 5,872,926 A | 2/1999 | Levac et al. | |
| 5,918,158 A | 6/1999 | LaPorta et al. | |
| 5,966,652 A | 10/1999 | Coad et al. | |
| 5,991,901 A | 11/1999 | Mulford et al. | |

FOREIGN PATENT DOCUMENTS

| JP | 05 275101 | 10/1993 |
|---|---|---|
| WO | WO-94/13093 | 6/1994 |

*Primary Examiner*—William Cumming
(74) *Attorney, Agent, or Firm*—Connolly Bove Lodge and Hutz LLP

(57) ABSTRACT

When a page message containing a caller ID is received from a caller, a call back message containing one of prepared response messages is transmitted to a call number associated with the caller ID. For this, the system displays the prepared response messages and prompts the user to select one of them. A call back message is compiled from a call back number associated with a caller ID contained in the page message and the selected response message. The call back message is transmitted to the call back number. The compilation of call back message is performed such that the format of call back message is adapted to the type of the caller's communication device associated with the caller ID.

22 Claims, 7 Drawing Sheets

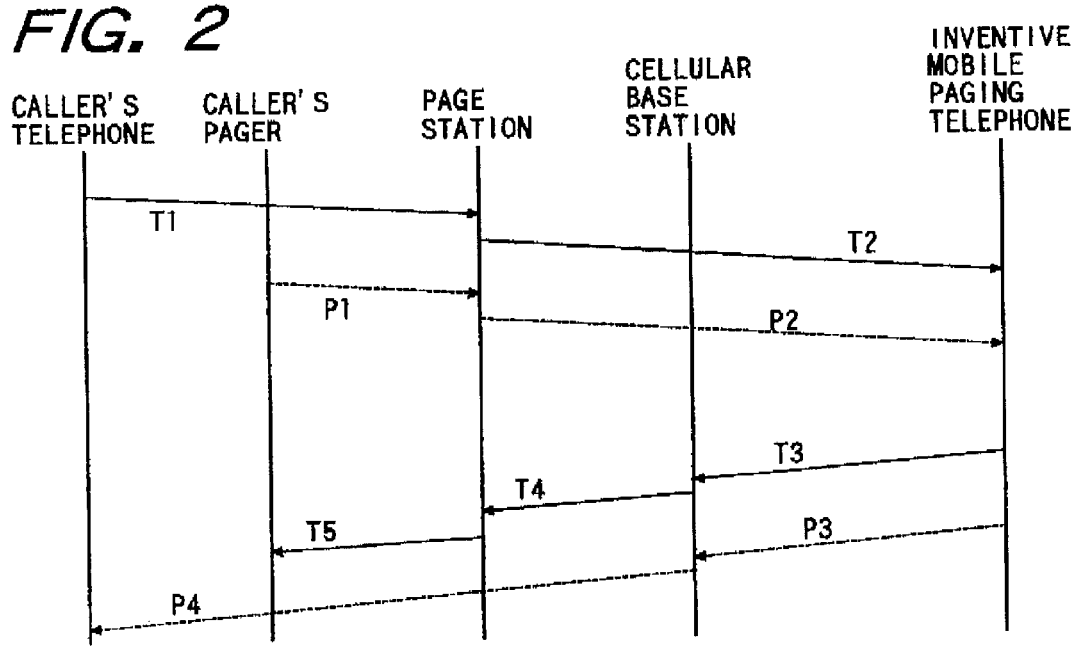
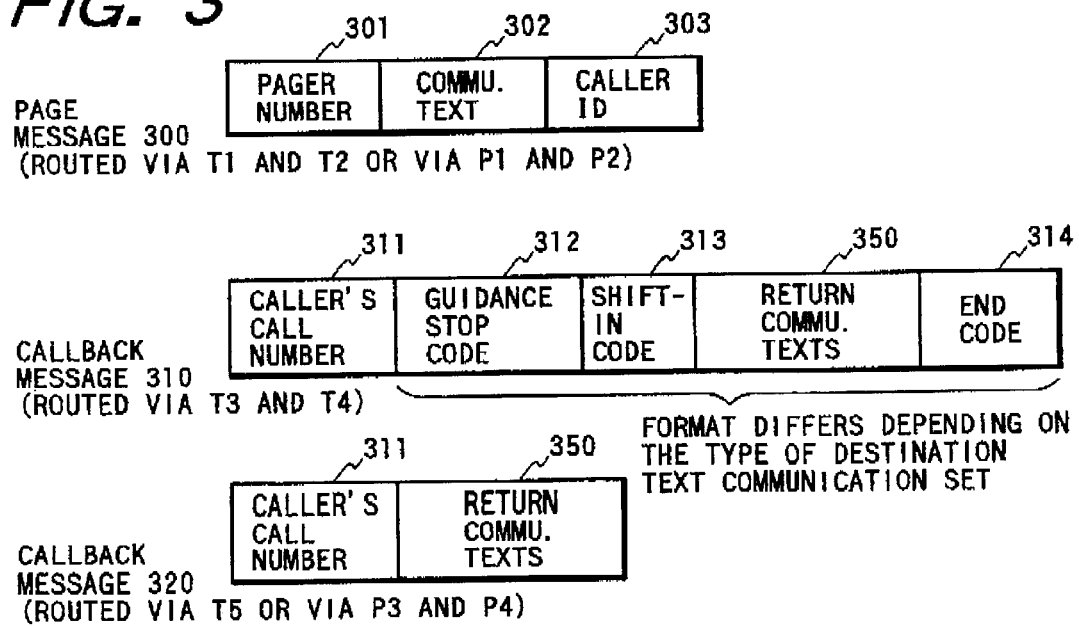

TELEPHONE NUMBER TABLE 500

| CALLER ID | NAME | CALL NUMBER | TYPE OF CALLER'S SET |
|---|---|---|---|
| 01 | TOM JACKSON | 012-345-6789 | X1 |
| 02 | BILL JOHNSON | 123-456-7890 | X2 |
| . | . | . | . |
| . | . | . | . |
| . | . | . | . |
|  501 | 502 | 503 | 504 |

RETURN COMMUNICATION TEXTS 350

| PREPARED RESPONSE MESSAGE | PAGED TIME | USER NAME | . . . |
|---|---|---|---|
| 351 | 352 | 353 | 354 |

MOBILE PAGING TELEPHONE WITH AN AUTOMATIC CALL BACK FUNCTION

This application is a continuation of U.S. patent application Ser. No. 09/033,566 filed Mar. 2, 1998 now U.S. Pat. No. 6,466,782.

BACKGROUND OF THE INVENTION

1. Field of the Invention

The present invention generally relates to a mobile paging telephone with a text (or character) message receiving capability and, particularly to, a system and a method applicable to such a telephone for automatically calling back a call back number associated with a caller transmitting one of predetermined text massages to the number in situations where a called party or a carrier of the telephone device can not call back immediately.

2. Description of the Prior Art

Various mobile paging telephones or mobile phones with a paging receiver have been proposed for far. One of such mobile paging telephones are disclosed in U.S. Pat. No. 5,559,862 (1996). With such a mobile paging telephone, a subscriber or a carrier of the telephone can receive a page message containing a call back number via a paging station from a caller. A predetermined operation by the subscriber will cause the call back number to be automatically dialed permitting him or her to communicate with the caller over the telephone. This enables the caller, who usually does not know the location of the subscriber or called party, to get in touch with him or her at any time the caller wants if he/she is in a situation where he/she can be on the phone in person at that time.

However, there may be cases where the called party can not call the caller back immediately. For example, the called party may be attending a conference, or talking on the phone over a matter which needs to be settled but which it takes some time to settle when he/she is paged. In these situations, the caller can not get any response, nor can he/she know whether the party to be called has been actually paged and got the page message.

Thus, a need exists in the art for a mobile paging telephone capable of automatically calling back a call back number associated with a caller transmitting one of predetermined text massages to the call back number. This enable the called party to inform the caller of the reception of the page message and rough information a situation of the called party. However, the call back operation may not be achieved successfully, which is the case for example when the called party is outside of the cellular telephone service area and/or when the paging station serving the mobile paging telephone is busy (these situations are hereinafter referred to as "routing failure situations").

A further need exists in the art for a mobile paging telephone which repeats call back operations till both of the routing failure situations is settled.

SUMMARY OF THE INVENTION

These and other needs are met by a system and a method used in a mobile paging telephone for automatically transmitting one of prepared response messages which is specified by the user to a call back number associated with the caller in accordance with the present invention. The present invention is applicable to any device provided with a text (or character) message receiving function and a mobile or cellular telephone. It is assumed that the call back number includes a telephone number, a mobile phone number, a pager number, etc. If the system receives a page message from a caller, the system displays the prepared response messages in response to the user or subscriber operating a predetermined control switch and prompts the user to select one of the displayed response messages. Selecting a response message causes a call back message to be compiled from a call back number associated with a caller ID contained in the page message and the selected response message. For this purpose, the system has a table which, for each of prospective callers, contains a record comprising a caller ID and a name of the prospective caller, and a call number and a type of his or her information device. The call back message is transmitted to the call back number. The compilation of call back message is performed such that the format of call back message is adapted to the type of the caller's device associated with the caller ID in the table. A paged time (i.e., a time when the paging call has been received from the caller) and/or the called party's name may be included in the call back message. This ensures the caller to receive a call back message including such information.

If the transmission of call back message is to be done in a situation where the mobile phone is busy, a situation where a paging station serving the mobile phone is busy and/or a situation where the mobile phone is located out of a service area, then the transmission operation is repeatedly attempted at a preset time interval till all of the situations are resolved.

BRIEF DESCRIPTION OF THE DRAWING

Further objects and advantages of the present invention will be apparent from the following description of the preferred embodiments of the invention as illustrated in the accompanying drawing, in which:

FIG. 2 is a diagram showing how page and call back messages are routed;

FIG. 3 is a diagram showing exemplary structures of the page message and the call back message used in the illustrative embodiment of the invention;

Throughout the drawing, the same elements when shown in more than one figure are designated by the same reference numerals.

DETAILED DESCRIPTION OF THE PREFERRED EMBODIMENTS

Figure 1:
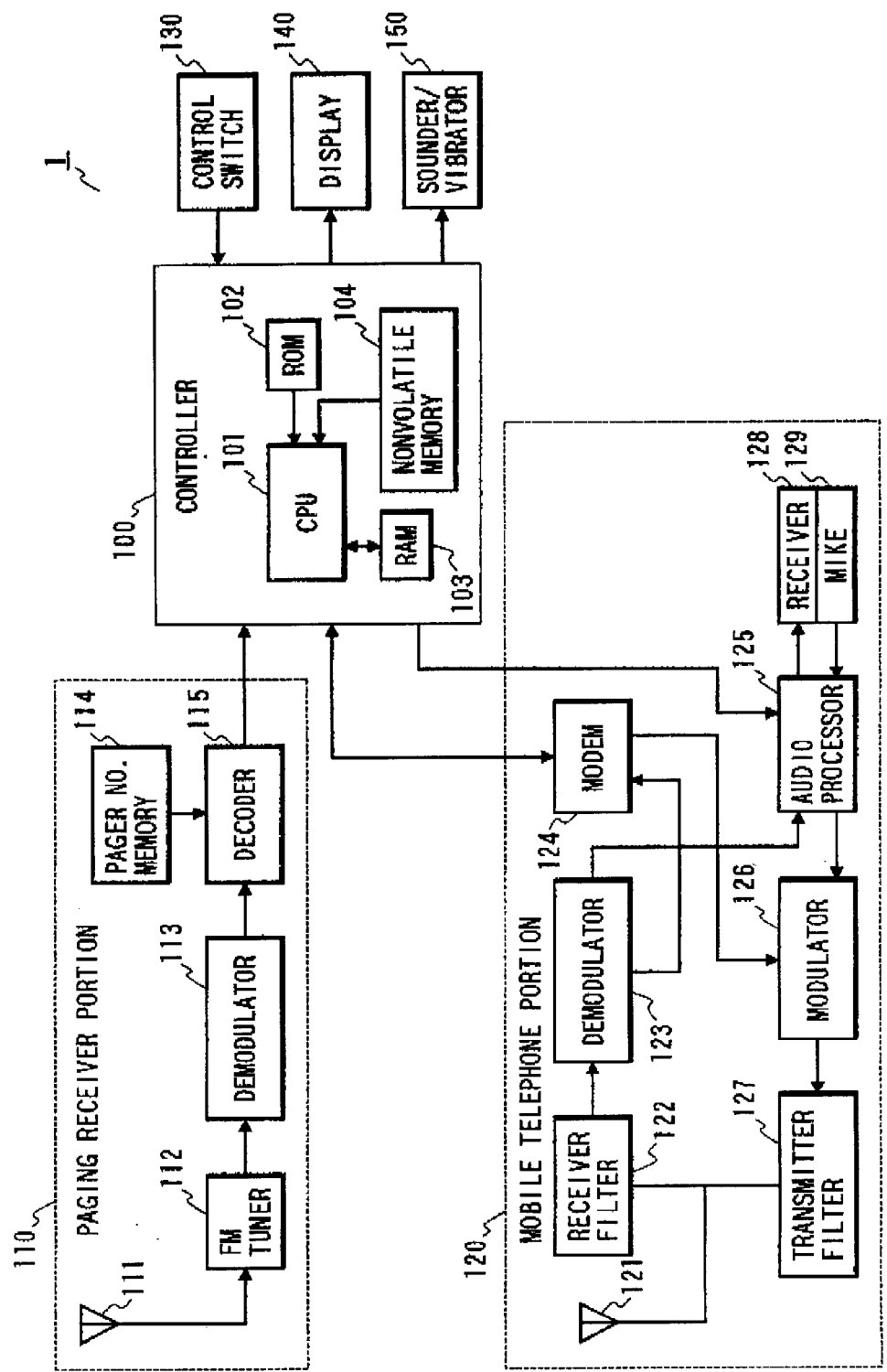
FIG. 1 is a block diagram showing an arrangement of a mobile paging telephone in accordance with an illustrative embodiment of the invention.

FIG. 1 is a block diagram showing an arrangement of a mobile paging telephone (or a mobile phones with a paging receiver) in accordance with an illustrative embodiment of the invention. In FIG. 1, the mobile paging telephone 1 comprises a paging receiver portion 110 responsive to a call addressed thereto for providing a page message carried by the call, a mobile phone portion 120, a controller 100 for controlling the portions 110 and 120, a control switch 130 through which the user controls the telephone 1, a display 140 on which the controller 100 displays various information, and a sounder/vibrator 150 for providing a sound or vibration output for alerting the user.

The paging receiver portion 110 comprises a paging receiver antenna 111 for receiving radio waves, an FM (frequency modulation) tuner 112 for extracting an FM page signal from the received radio waves, a demodulator 113 for demodulating the FM page signal, a pager number memory 114 for storing a pager number having been assigned to the mobile paging telephone 1 and a decoder 115 which determines if the received pager number coincides with the one stored in the pager number memory 114.

The mobile phone portion 120 comprises an antenna 121, a receiver filter 122 for cutting off unnecessary frequencies from the received signal, a demodulator 123 for demodulating a passed high frequency signal into a base band signal, a modem (or modulator/demodulator) 124 for demodulating control data in the base band signal into a digital signal and modulating a digital control signal into the base band signal, an audio processor 125 for performing bi-directional conversions between a base band signal and a speech signal, a modulator 126 for converting the base band signals from the modem 124 and the audio processor 125 into a high frequency signal, a transmitter filter 127, a receiver 128 for providing a speech output from the audio processor 125 output, and a microphone (MIKE) 129 for converting a speech input into the speech signal to the audio processor 125.

The controller 100 may be any suitable microcomputer and preferably comprises a CPU (central process unit) 101, a ROM (read only memory) 102 for storing program modules as detailed later, a RAM (random access memory) 103, and a nonvolatile memory 104 for storing various data as detailed later.

Referring now to FIGS. 2 and 3, operation of the mobile paging telephone 1 of FIG. 1 will be described in the following. FIG. 2 is a diagram showing how a page message and a call back messages are routed and FIG. 3 is a diagram showing exemplary structures of the page message and the call back message used in the illustrative embodiment of the invention. It is assumed that a caller has placed a call addressed to the mobile paging telephone 1 with a communication text "CALL ME BACK IMMEDIATELY" from a telephone. Then, a page message 300 of FIG. 3 containing the communication text is transmitted from the caller's telephone to a paging station (path T1) and then from the paging station to the mobile paging telephone 1 (path T2) as shown in FIG. 2. (If the caller has placed the call from a pager, then the page message 300 is transmitted from the caller's pager to the paging station through path P1 and from the paging station to the mobile phone 1 through path P2 as shown in broken lines in FIG. 2.) The page message 300 comprises a pager number 301 assigned to the telephone 1, the communication text (COMMU. TEXT) 302 ("CALL ME BACK IMMEDIATELY" in this example) and a caller ID. As is well known, the page message 300 is received by the antenna 111, selected by the FM tuner 112, demodulated by the demodulator 113, and tested, to see if the pager number 301 matches one stored in the page No. memory 114, by the decoder 115, which then passes the communication text 302 and the caller ID 303 to the controller 100 to report thereto a page message reception.

Figure 4:
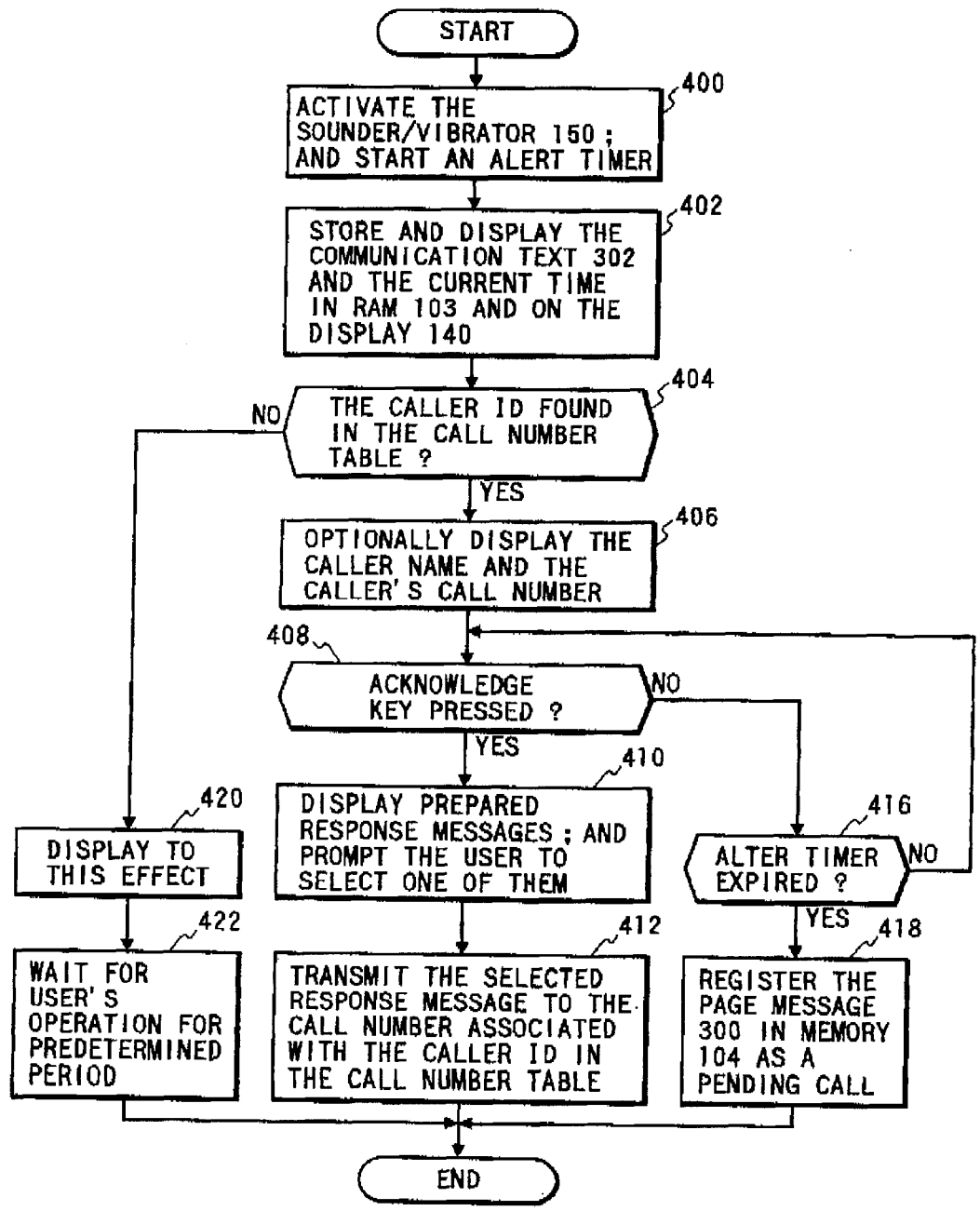
FIG. 4 is a flow chart of a program module stored in ROM 102 and executed by CPU 101 when CPU 101 or the controller 100 receives the communication text 302 and the caller ID 303 from the paging receiver portion 110.

FIG. 4 is a flow chart of a program module stored in ROM 102 and executed by CPU 101 when CPU 101 or the controller 100 receives the communication text 302 and the caller ID 303 from the paging receiver portion 110. In FIG. 4, the controller 100 activates the sounder/vibrator 150 to alert the user of the mobile phone 1 and starts an alert timer (not shown) which determines the duration of alert operation in step 400; stores and displays the received communication text 302 in RAM 103 and on the display 140, respectively and also stores the current time in RAM 103 as a time stamp and displays the time in step 402.

Figures 5, 6, 7:
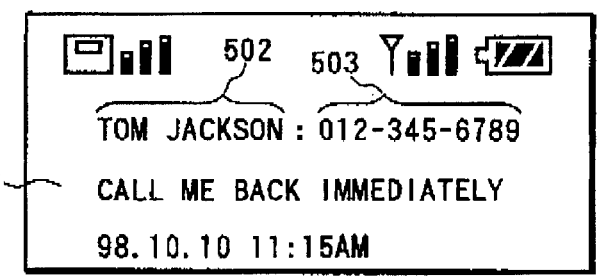
FIG. 5 is a call number table which is stored in the nonvolatile memory 104 and which contains information on a call back destination associated with each of prospective callers.
FIG. 6 is a diagram showing examples of the return communication texts 350 in detail.
FIG. 7 is a diagram showing an exemplary screen displayed on the display device 140 in step 406.

According to the invention, the mobile paging telephone is provided with a call number table stored in the nonvolatile memory 104. FIG. 5 shows a call number table 500 which contains information on a call back destination associated with each of prospective callers. As shown in FIG. 5, each of the records of the table 500 comprises a caller ID 501 field, a name 502 field, a call number 503 field, and a field which contains a type code 504 of the caller's telephone or pager. The user of the mobile phone 1 preferably asks each of his or her prospective callers the call number 503 and the type (i.e., the manufacturer and the model name) 504 of a pager or a device with a text communication capability which the prospective caller wants the user to call, enters the obtained information in the table 500 associating the information with a caller ID or number 501, and lets each prospective caller know his or her ID 501. For example, for a prospective caller Tom Jackson, the user stores his name, a call number 012-345-6789 and a type code as a record "01", and similarly stores Bill Johnson, 123-456-7890 and X2 as a record "02".

Returning now to FIG. 4, CPU 101 searches the caller ID field of the call number table 500 for the caller ID 303 which has been received from the paging receiver portion 110. If the search is successful or the test result of step 404 is YES, then CPU 101 may optionally display the name 502 and/or the call number 503 of the caller derived from the found record of the caller ID 303 in the call number table 500 in step 406. An example of thus displayed screen is shown in FIG. 7.

If the user or called party has pressed a predetermined key, say, an acknowledge key (not shown) of the control switch 130 while the sounder/vibrator 150 is active (the test result of step 408 is YES), then CPU 101 displays prepared response messages (not shown), prompts the user to select one of the displayed response message and press a predetermined button (not shown) of the control switch 130 in step 410. Then, CPU 101 transmits a call back message containing the selected response message as a return communication text, 310 as shown in FIG. 3, to the call number 503 associated with the caller ID 303 in the call number table 500 in step 412, and ends the process.

If the alert timer (not shown) which has been started in step 400 has expired without the acknowledge key (not shown) of the control switch 130 being pressed (decision step 416), then CPU 101 registers the page message 300 in memory 104 as a pending call in step 418 so as to let the user know later that there is a page message which has not been answered by the user. If the caller ID 303 is not found in step 404, then CPU 101 displays to this effect in step 420, and waits for user's operation for a predetermined period of time in step 422. After step 418 or 422, CPU 101 ends the process.

The call back message 310 transmitted in step 412 is shown in FIG. 3. As shown, the call back message 310 comprises a caller's or destination call number 311 which has been derived from the call number 503 field of a record with the caller ID value=the caller ID 303 in the call number table 500, a guidance stop code 312 for stopping the guidance for prompting user's operations which is sent from the paging station of FIG. 2, a message shift-in code 313 which indicates the start of a series of return communication texts, the series of return communication texts 350 at least including one of the prepared response messages which has been selected by the user, and an end code 314 which indicates the end of the series of return communication texts 350. It is noted that the format of a part of the call back message 310 beginning with the guidance stop code 312 and ending with the end code 314 differs depending on the type of destination text communication set such as a pager, mobile phone. For this reason, the compilation of a call back message 310 in step 412 is achieved in accordance with the type 504 associated with the called ID 303.

FIG. 6 is a diagram showing examples of the return communication texts 350 in detail. In FIG. 6, the return communication texts 350 preferably comprise a prepared response message (i.e., a selected one of the prepared response messages) 351, a paged time or a time which has been stamped when CPU 101 received the page message 300, the name of the user, etc.

If the call back message 310 is transmitted in step 412, the message 310 is transmitted from the present telephone 1 to the cellular base station (through the radio communication path T3) and from the cellular base station to the paging station (through the communication path T4) as shown in FIG. 2. The paging station in turn transmits a call back message 320 of FIG. 3 to the destination or caller's pager through the radio communication path T5. The call back message 320 only comprises the caller or destination call number 311 and the return communication texts 350. In this way, the caller can receive the prepared response message 351, a paged time 352, the name of the called party (or the user of the mobile paging telephone 1) and so on, and accordingly can be at least informed of the reception of the page message 300 by the called party, the reception time and a brief message from the called party.

(It is noted that if the call back destination is a caller's telephone in step 412, then the call back message 320 is transmitted from the mobile phone 1 to the cellular base station through path P3 and from the cellular base station to the caller's telephone through path P4 as shown in broken lines in FIG. 2.)

Figure 8:
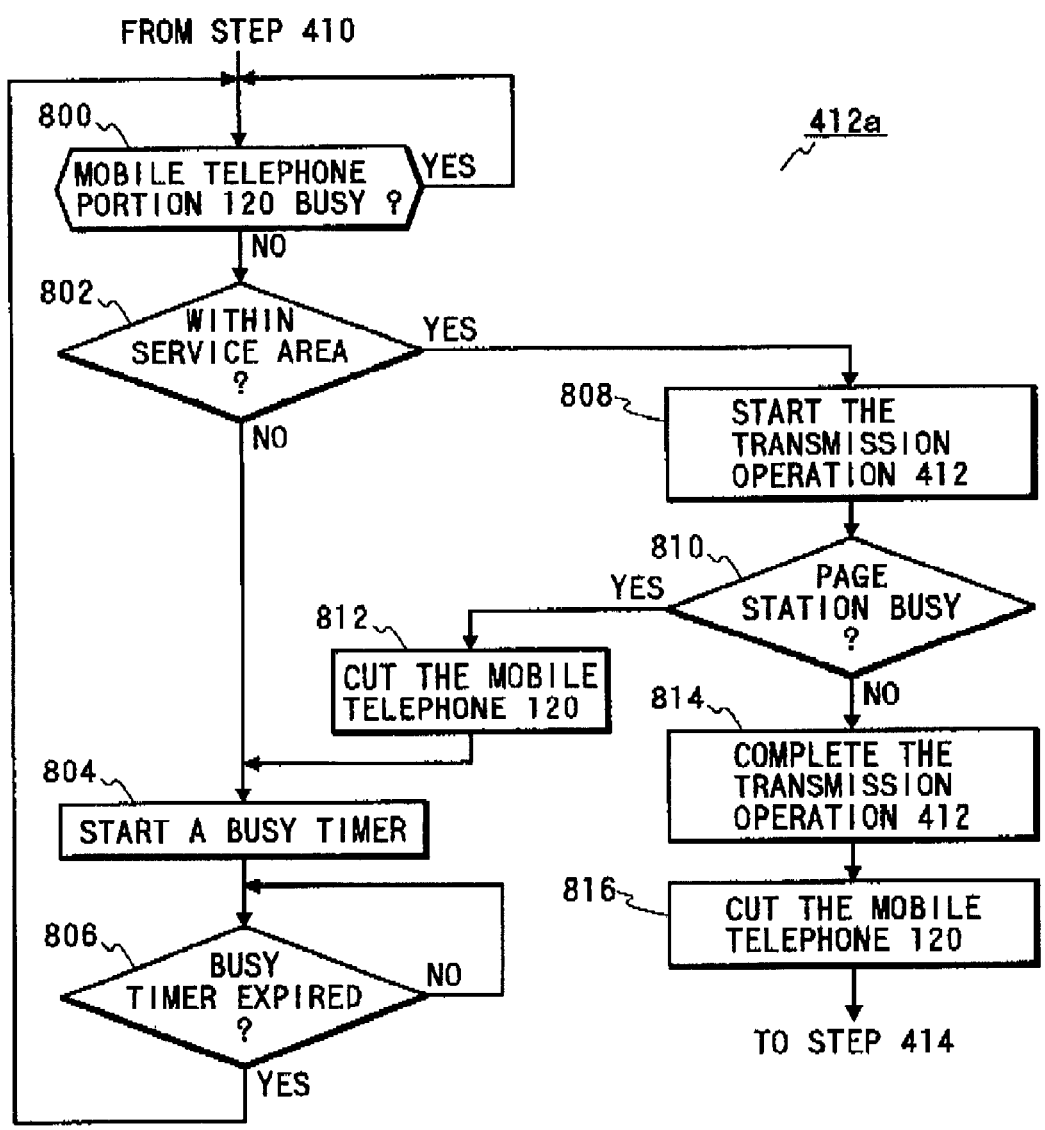
FIG. 8 is a flow chart of a program module 412a stored in ROM 102 and executed in place of step 412 of FIG. 4.

The operation of transmitting the call back message 310 in step 412 will be discussed in detail taking into account a mobile phone portion 120 busy state, an out-of-service area state and a paging station busy state in the following. FIG. 8 is a flow chart of a program module 412a stored in ROM 102 and executed in place of step 412 of FIG. 4. In FIG. 8, after step 410 of FIG. 4, CPU 101 starts executing the module 412a with step 800, where CPU 101 makes a test to see if the mobile phone portion 120 is busy. The test is repeated till the test result in step 800 becomes NO. When this happens, CPU 101 proceeds to step 802, where CPU 101 makes another test to see if the mobile paging telephone 1 is within the service area. If not, then CPU 101 starts a busy timer in step 804 and makes a test in step 806 to see if the busy timer has expired. If not, CPU 101 repeats step 806. If the test result is YES in step 806, CPU 101 returns to step 800. If the telephone 1 is within the service area in step 802, then CPU 101 starts the transmission operation of step 412 in step 808 and makes a test in step 810 to see if the paging station is busy. If so, then CPU 101 cuts the mobile phone 120 in step 812 and returns to step 800 after waiting for a time period timed by the above mentioned busy timer in steps 804 and 806. Otherwise, CPU 101 completes the transmission operation 412 in step 814, and cuts the mobile phone 120 in step 816, ending this program module 412a and accordingly ending the main process of FIG. 4.

As seen from the foregoing, once the user selects one of the prepared response messages and presses a predetermined button, even if the situation is in a mobile phone 120 busy state, an out-of-service area state and/or a paging station busy state, a transmission operation for the call back message is repeatedly attempted till all of the above mentioned states are resolved. This assures the caller of the reception of call back message.

Figure 9:
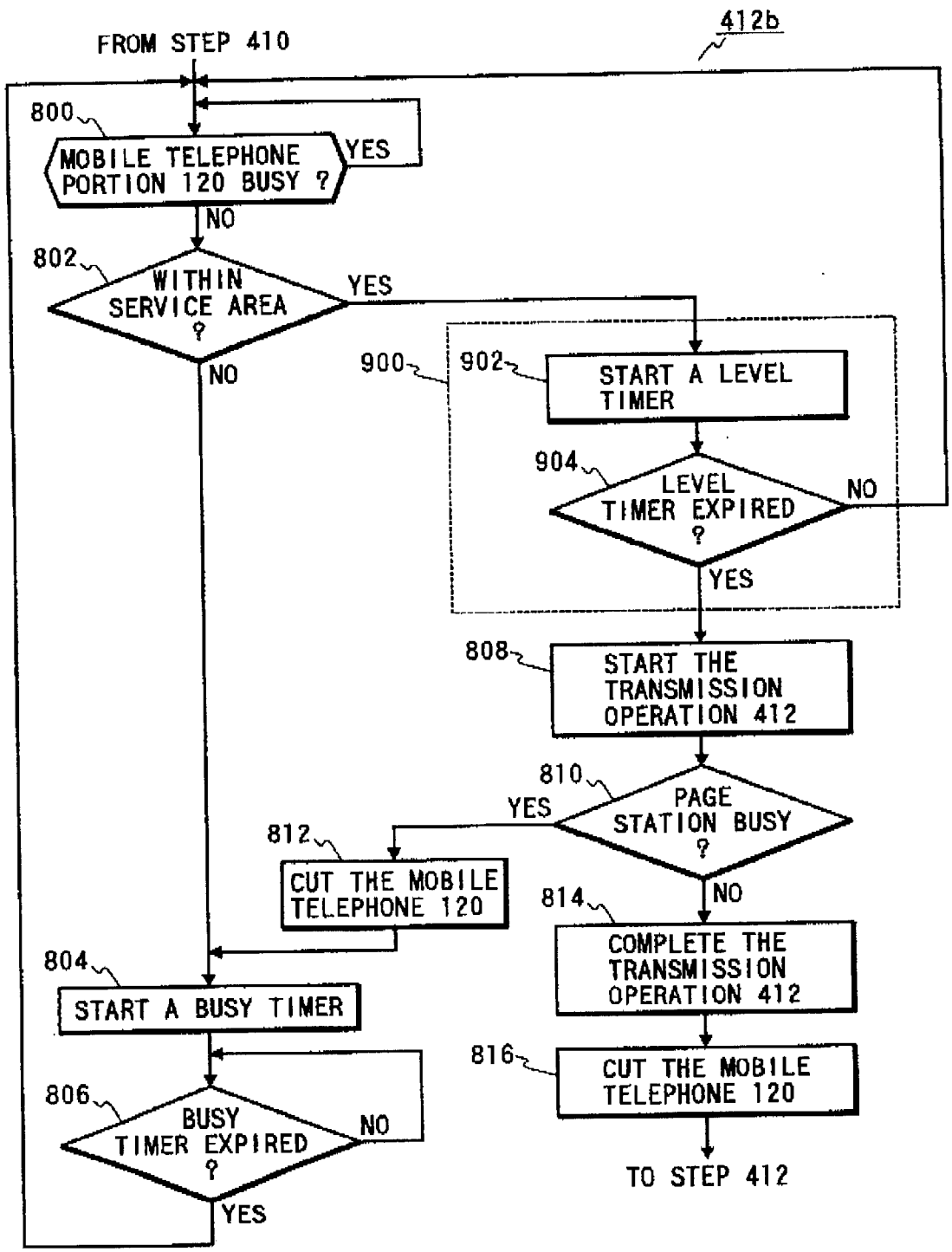
FIG. 9 is a flow chart of a program module 412b stored in ROM 102 and executed in place of step 412 of FIG. 4.

However, the electric field may not be sufficiently strong even if the test result is YES in step 802 when the user have just entered the service area. This may degrade the communication quality. In order to avoid this, a wait routine is preferably inserted between steps 802 and 808 as shown in FIG. 9, which is identical to FIG. 8 except that a wait routine 900 comprising steps 902 and 904 has been inserted between steps 802 and 808. In FIG. 9, after step 802, CPU 101 starts a level timer in step 902 and makes a test in step 904 to see if the level timer has been expired. If not, then CPU returns to step 800. If the test result in step 904 is YES, then CPU 101 proceeds to step 808, thereafter following the same flow as that of FIG. 8.

Figure 10:
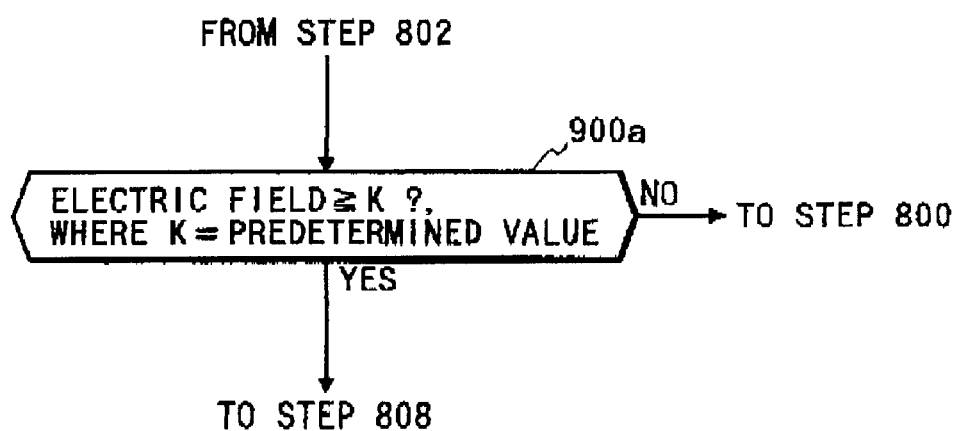
FIG. 10 is a diagram showing an electric field level check step which can be replaced with a routine 900 of FIG. 9 to ensure a predetermined level of electric field.

Alternatively, the wait routine 900 may be replaced with a level check step as shown in FIG. 10. In level check step 900a of FIG. 10, CPU 101 makes a test to see if the electric field is equal to or larger than a predetermined value K. In this way, the transmission of call back message is ensured according to the principles of the invention.

Although the invention has been described in detail with respect to specific embodiments, various modifications can be made without departing from the scope of the invention. For example, the invention has been described in conjunction with a mobile phone with a paging receiver. However, the invention is applicable to any information terminal which includes a mobile phone function and a text message communication function.

The above described prepared response messages may comprise not only response messages having been prepared by the manufacturer but also one(s) defined by the user.

The above mentioned busy, level and other timers can be set for desired expiration values by the user. However, the counters has been preferably set for respective default expiration values by the manufacturer.

It should be understood that the present invention is not limited to the specific embodiments described in the specification, except as defined in the appended claims.

What is claimed is:

1. In a system provided with a mobile phone and a capability of receiving a page message from a caller, a method for automatically transmitting a selected pre-stored call back message to a call back number associated with the caller in response to reception of the page message, the method comprising the steps of:

storing a data structure entered in the phone by a system user including caller ID call back number and identification of each prospective caller;

in response to said reception of said page message, displaying response messages that are pre-stored and prepared for use in calling back in a situation where said user is too busy to call back and permitting said user to select one of said prepared response messages;

in response to the selection by said user, compiling said call back message; and transmitting said call back message to said call back number.

2. A method as defined in claim 1, wherein said information includes a type of his or her communication device, and wherein said step of compiling said call back message comprises the step of compiling said call back message in accordance with a type associated with said caller ID contained in said page message.

3. A method as defined in claim 1, further comprising the step of displaying said page message and at least one of a name of said caller included in said information and said call back telephone.

4. A method as defined in claim 1, wherein said step of compiling said call back message comprises the step of including, in said call back message, at least one of a time of said reception of said page message and a name of said user.

5. A method as defined in claim 1, wherein said step of transmitting said call back message comprises the step of:
   in a situation where said mobile phone is busy, repeatedly attempting said transmitting at a preset time interval till said situation is resolved.

6. A method as defined in claim 1, wherein said step of transmitting said call back message comprises the step of:
   in a situation where a paging station serving said mobile phone is busy, repeatedly attempting said transmitting at a preset time interval till said situation is resolved.

7. A method as defined in claim 1, wherein said step of transmitting said call back message comprises the step of:
   in a situation where said mobile phone is located out of a service area, repeatedly attempting said transmitting at a preset time interval till said situation is resolved.

8. In a portable device provided with a mobile phone and a capability of receiving a page message from a caller, a system for automatically transmitting a selected pre-stored call back message to a call back number associated with the caller in response to reception of the page message, the system comprising:

means for storing a data structure entered in the device by a portable device user including caller ID call back number and identification of each prospective caller;

means responsive to said reception of said page message for displaying response messages that are pre-stored in the device and prepared for use in calling back in a situation where said user is too busy to call back and for permitting said user to select one of said prepared response messages;

means responsive to the selection by said user for compiling said call back message and means for transmitting said call back message to said call back number.

9. A system as defined in claim 8, wherein said means for compiling said call back message comprises a table which, for each prospective caller, contains a record at least comprises a caller ID and a name of the prospective caller and a call number and a type of his or her communication device.

10. A system as defined in claim 8, wherein said means for compiling said call back message comprises means for compiling said call back message in accordance with a type of a destination device associated with said caller ID contained in said page message.

11. A system as defined in claim 8, further comprising means displaying said page message and at least one of said name and said call number associated with said caller ID.

12. A system as defined in claim 8, wherein said means for compiling said call back message comprises means for including, in said call back message, at least one of a time of said reception of said page message and a name of said user.

13. A system as defined in claim 8, wherein said means for transmitting said call back message comprises:
   means operative in a situation where said mobile phone is busy for repeatedly attempting said transmitting at a preset time interval till said situation is resolved.

14. A system as defined in claim 8, wherein said means for transmitting said call back message comprises:
   means, operative in a situation where a paging station serving said mobile phone is busy, for repeatedly attempting said transmitting at a preset time interval till said situation is resolved.

15. A system as defined in claim 8, wherein said means for transmitting said call back message comprises:
   means, operative in a situation where said mobile phone is located out of a service area, for repeatedly attempting said transmitting at a preset time interval till said situation is resolved.

16. A mobile paging telephone capable of receiving a page message from a caller and automatically transmitting a selected pre-stored call back message to a call back number associated with the caller, the mobile paging telephone comprising:

means for storing a data structure entered in the telephone by a telephone user including caller ID call back number and identification of each prospective caller;

means responsive to said reception of said page message for displaying response messages that are pre-stored in the telephone and prepared for use in calling back in a situation where said user is too busy to call back and for permitting said user to select one of said prepared response messages;

means responsive to the selection by said user for compiling said call back message; and means for transmitting said call back message to said call back number.

17. A mobile paging telephone as defined in claim 16, wherein said means for compiling said call back message comprises means for compiling said call back message in accordance with a type of a destination device associated with said caller ID contained in said page message.

18. A mobile paging telephone as defined in claim 16, wherein said means for transmitting said call back message comprises:

means, operative in a situation where said mobile phone is busy, a situation where a paging station serving said mobile phone is busy and/or a situation where said mobile phone is located out of a service area, for repeatedly attempting said transmitting at a preset time interval till all of said situations are resolved.

19. A mobile system comprising:

page receiving means for receiving a page message from a caller and alerting a user of the system;

cellular telephone means capable of transmitting a text message;

means for storing a data structure entered in the mobile system by a mobile system user including caller ID call back number and identification of each prospective caller;

means responsive to said reception of said page message for displaying response messages that are pre-stored in the mobile system and prepared for use in calling back in a situation where said user is too busy to cell back and for permitting said user to select one of said prepared response messages;

means responsive to the selection by said user for compiling said call back message; and means for transmitting said call back message to said call back number.

20. A system as defined in claim 19, wherein said means for compiling said call back message comprises means for compiling said call back message in accordance with a type of a destination device associated with said caller ID contained in said page message.

21. A system as defined in claim 19, wherein said means for transmitting said call back message comprises:

means, operative in a situation where said mobile phone is busy, a situation where a paging station serving said mobile phone is busy and/or a situation where said mobile phone is located out of a service area, for repeatedly attempting said transmitting at a preset time interval till all of said situations are resolved.

22. A system as defined in claim 19, wherein said means for compiling said call back message comprises means for associating a caller ID of each of prospective callers with a name of the prospective caller, and a call number and a type of his or her information device.

\* \* \* \* \*